US007600219B2

(12) United States Patent
Tsantilis

(10) Patent No.: US 7,600,219 B2
(45) Date of Patent: Oct. 6, 2009

(54) METHOD AND SYSTEM TO MONITOR SOFTWARE INTERFACE UPDATES AND ASSESS BACKWARD COMPATIBILITY

(75) Inventor: Efstratios Tsantilis, Sinsheim (DE)

(73) Assignee: SAP AG, Walldorf (DE)

( * ) Notice: Subject to any disclaimer, the term of this patent is extended or adjusted under 35 U.S.C. 154(b) by 685 days.

(21) Appl. No.: 10/730,975

(22) Filed: Dec. 10, 2003

(65) Prior Publication Data

US 2005/0132346 A1    Jun. 16, 2005

(51) Int. Cl.
     *G06F 9/44*        (2006.01)
(52) U.S. Cl. .................. 717/122; 717/168; 717/170; 707/203
(58) Field of Classification Search ............ 707/203; 717/122, 168, 170
See application file for complete search history.

(56) References Cited

U.S. PATENT DOCUMENTS

| | | | | |
|---|---|---|---|---|
| 6,073,161 | A * | 6/2000 | DeBoskey et al. | 709/200 |
| 6,298,353 | B1 * | 10/2001 | Apte | 707/103 R |
| 6,519,767 | B1 * | 2/2003 | Carter et al. | 717/140 |
| 6,591,417 | B1 * | 7/2003 | Strysniewicz et al. | 717/168 |
| 6,678,882 | B1 * | 1/2004 | Hurley et al. | 717/121 |
| 6,873,935 | B2 * | 3/2005 | Spinrad et al. | 702/186 |
| 6,898,768 | B1 * | 5/2005 | Theodossy et al. | 716/5 |
| 6,971,093 | B1 * | 11/2005 | Spring | 717/170 |
| 6,986,132 | B1 * | 1/2006 | Schwabe | 717/168 |
| 7,069,474 | B2 * | 6/2006 | Atallah et al. | 714/39 |
| 7,191,196 | B2 * | 3/2007 | Perks et al. | 707/203 |
| 7,191,435 | B2 * | 3/2007 | Lau et al. | 717/168 |
| 7,216,343 | B2 * | 5/2007 | Das et al. | 717/168 |
| 7,289,973 | B2 * | 10/2007 | Kiessig et al. | 707/1 |
| 2005/0022176 | A1 * | 1/2005 | Ramachandran et al. | 717/170 |
| 2005/0086642 | A1 * | 4/2005 | Runte et al. | 717/122 |

OTHER PUBLICATIONS

Seacord et al., "K-BACEE: knowledge-based automated component ensemble evaluation", 2001, Proceedings of the 27th Euromicro Conference.*
Boonsiri et al., "Automated Component Ensemble Evaluation", Aug. 2002, International Journal of Information Technology, vol.8, No. 1.*
Lin et al., "Multiuser Collaborative Work in Virtual Environment based CASE Tool", Apr. 2003, Information and Software Technology, vol. 45, Issue 5, pp. 253-267.*

* cited by examiner

*Primary Examiner*—Lewis A Bullock, Jr.
*Assistant Examiner*—Jue S Wang
(74) *Attorney, Agent, or Firm*—Kenyon & Kenyon LLP

(57) ABSTRACT

A system and method for monitoring updates to the interface portion of a software library or repository. An embodiment of the invention determines whether detected changes made to the software interface are likely to cause backward compatibility problems. Initially, an embodiment assembles and stores a snapshot of a baseline version of the software interface. Then, an embodiment assembles a snapshot of an updated version of the interface and compares the updated snapshot to the baseline snapshot to detect whether any changes have been made. Any differences between the updated snapshot and the baseline snapshot are rated by an embodiment according to a backward compatibility metric and reported in an alert message to an appropriate user.

32 Claims, 4 Drawing Sheets

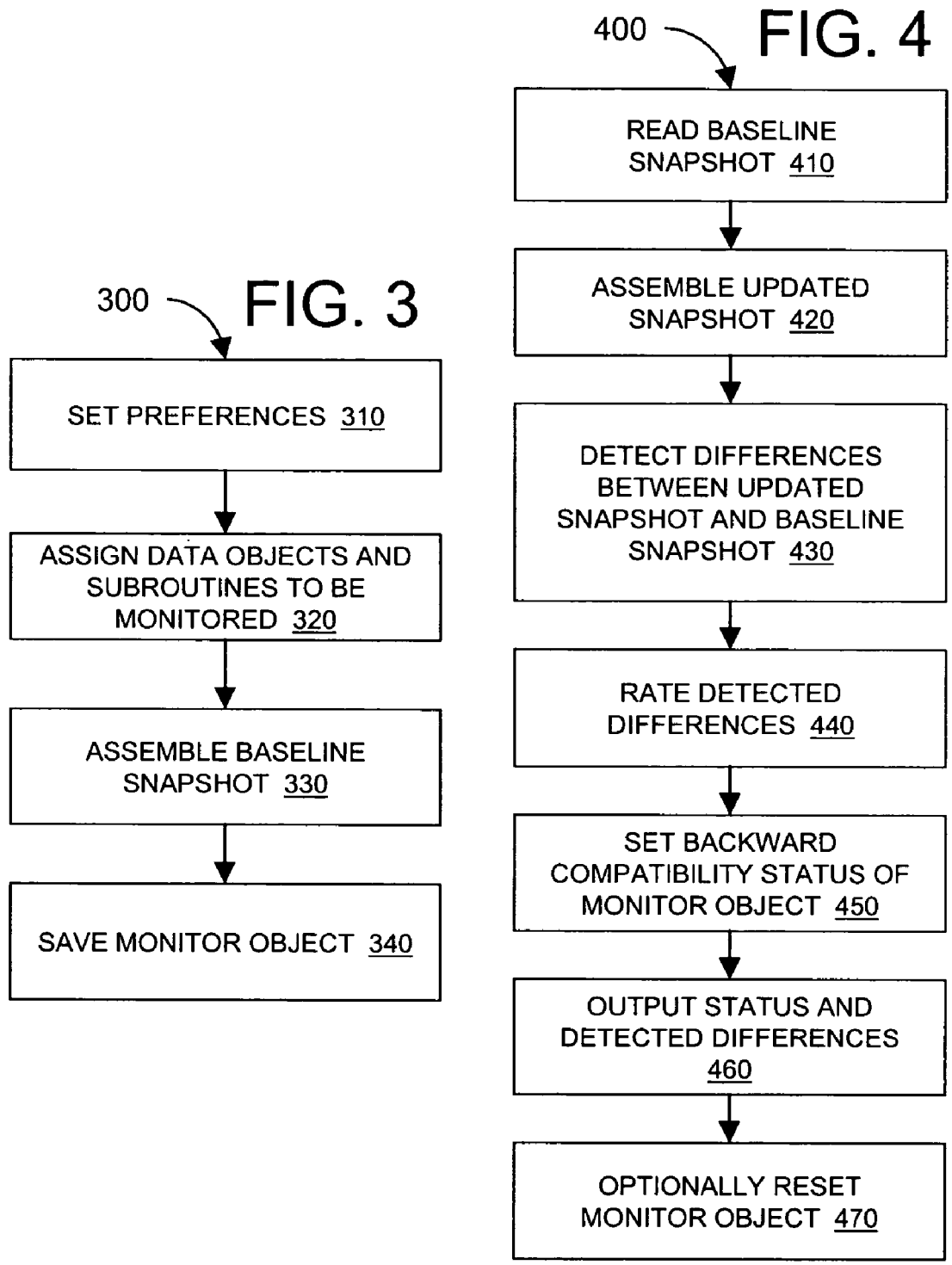

METHOD AND SYSTEM TO MONITOR SOFTWARE INTERFACE UPDATES AND ASSESS BACKWARD COMPATIBILITY

TECHNICAL FIELD

This invention relates generally to software update monitoring. More specifically, the invention relates to a method and system for monitoring changes to the interface portions of software objects, modules, and libraries.

BACKGROUND OF THE INVENTION

Computer programs frequently rely on external software libraries to provide necessary functionality. These software libraries—also referred to as software repositories—are typically collections of software modules that are designed to perform a variety of tasks pertaining to a given subject matter. To employ the capabilities of a given software module residing in a library, a programmer typically writes an application program, usually in the same language in which the library has been coded. The application program normally includes an appropriate procedure call according to the exact syntax necessary to invoke the desired module. Depending on the way the desired module has been coded, certain parameters and other data may also be supplied as part of the procedure call, in order to invoke the module properly and to achieve the desired result. In object-oriented languages, the concept of using previously-developed software modules residing in libraries has been broadened to include the use of software objects. Software objects are self-contained software building blocks that incorporate data as well as processing logic.

When an existing software library is modified in order to correct errors or to provide new functionality, the interface portions of the software modules in the library may be changed. For example, a new parameter may be added, an existing parameter may be deleted, or an optional parameter may become mandatory. Such updates to the interface portions of existing software libraries may jeopardize the proper operation of application programs that were designed to use previous versions of these software modules. Unless a programmer of an application program is notified when a module in a software library has been changed, the application program may no longer function as designed. Instead, unpredictable errors may occur when a changed software module is invoked by an application program that uses an out-of-date invocation syntax.

Not all software architectures exhibit this kind of problem. For example, some application programs are statically linked. In these more traditional software architectures, a linking program resolves all references made to external software modules residing in libraries. The linker then builds a self-contained, stand-alone executable program that contains a copy of every software module required by the program. Once a final executable program has been created by the linker, subsequent modifications to the external software libraries will have no effect. This is because the previously-created executable program still includes a copy of the older version of the required software modules.

Because static linking software architectures create stand-alone executable programs, every statically linked program that uses a software module obtained from a given software library will contain a separate copy of the module's executable code that has been extracted from that library. For this reason, after a program has been statically linked, if a component software module is then updated to correct errors, the statically linked program will not receive the benefit of that update. A technique known as "dynamic linking" addresses this concern by creating a dynamic link library. A dynamic link library (DLL) is a relocatable software library that is linked to a program at run time—that is, whenever the program is executed. Unlike statically linked programs, a program created in a dynamic linking environment does not contain a copy of every software module required by the program. Instead, when a dynamically linked program is loaded into memory, a linking loader first ascertains whether the required DLL is already resident in memory. If it is not, the DLL must be loaded by a linking loader into a free area of memory and its base address determined. All outstanding references to software modules within the DLL are then resolved by the linking loader, and execution of the program is allowed to proceed.

Dynamic linking ensures that only one copy of a library module will be loaded into memory when a program executes. All programs share the same version of the library. Thus, when a DLL is updated, all programs that subsequently invoke a software module in that DLL will automatically use the updated version.

Other known software architectures include features that are similar to dynamic linking. For example, a remote procedure call (RPC) provides an interface mechanism that permits a local program to invoke a software module that resides on a remote computer. The local calling program sends an RPC invocation message, including any required parameters, to a remote computer. A message receiver on the remote computer accepts the message, invokes the proper software module on behalf of the calling program, and then sends the results back to the calling program. As in the case of DLLs, if a remote software module is updated, the new version becomes immediately available to all calling programs that invoke it.

In object oriented architectures, a software library may maintain software objects that have been developed to perform critical or commonly-used functions. Such an object-oriented software library may reside locally on the same computer that executes a calling application program. On the other hand, an object-oriented software library may reside remotely on another computer. When an application or calling program sends a message to an object (thereby invoking a corresponding object method), an underlying software utility may access the library, locate the appropriate object, and invoke the object using a local dynamic invocation method or it may invoke the object using a remote invocation method, depending on where the object is located.

When dynamically linked or remotely invoked software modules or objects are modified by a software developer, a calling program that uses the modified software module or object may cease to function as designed, depending on the extent of the modification. If the underlying software architecture is one that includes runtime syntax checking, a program that functioned well previously may suddenly generate errors and stop executing if, for example, an updated software module is invoked with an old parameter list. On the other hand, if the changes are not significant enough to cause a runtime system to generate a syntax error, the calling program may nevertheless experience other runtime errors if the updated software module is invoked, for example, with a parameter that supplies a value that is no longer within an acceptable range or the parameter is supplied in an out-of-date format.

Similar errors may occur if a software architecture detects that a library has been updated relative to a calling application, and automatically attempts to recompile the application. In this situation, an application program that previously performed flawlessly may suddenly no longer execute because compilation errors materialized after an underlying software library was updated.

Accordingly, there is a need in the art for a system and method to monitor updates to software libraries and to notify appropriate software engineers when a modification is likely to cause a given software module to be no longer backward compatible with previous versions.

SUMMARY OF THE INVENTION

Embodiments of the present invention are directed to a system and method for monitoring updates to the interface portion of a software library or repository. An embodiment of the invention determines whether detected changes made to the software interface are likely to cause backward compatibility problems. Initially, an embodiment assembles and stores a snapshot of a baseline version of the software interface. Then, an embodiment assembles a snapshot of an updated version of the interface and compares the updated snapshot to the baseline snapshot to detect whether any changes have been made. Any differences between the updated snapshot and the baseline snapshot are rated by an embodiment according to a backward compatibility metric and reported in an alert message to an appropriate user.

BRIEF DESCRIPTION OF THE DRAWINGS

FIG. 3 is a high-level flow chart illustrating a method for creating a monitor object for monitoring a software repository, according to an embodiment of the present invention.

FIG. 4 is a high-level flow chart illustrating a method for updating a monitor object, according to an embodiment of the present invention.

DETAILED DESCRIPTION

Figure 1:
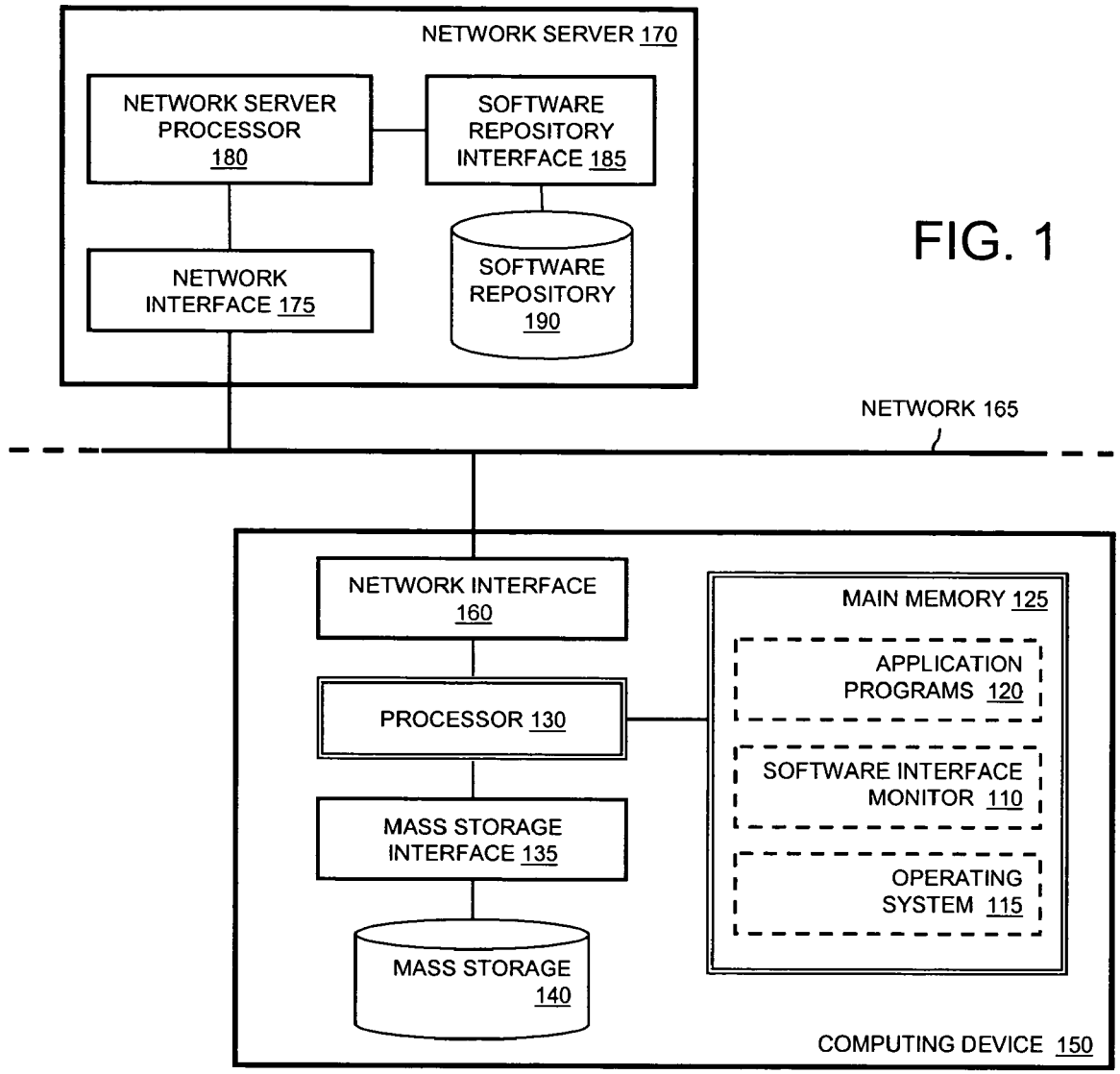
FIG. 1 is a high-level block diagram of a computer system incorporating a software interface monitor in accordance with an embodiment of the present invention.

Embodiments of the present invention will be described with reference to the accompanying drawings, wherein like parts are designated by like reference numerals throughout, and wherein the leftmost digit of each reference number refers to the drawing number of the figure in which the referenced part first appears.

FIG. 1 is a high-level block diagram of a computer system incorporating a software interface monitor in accordance with an embodiment of the present invention. Software interface monitor 110 may be loaded into main memory 125 of computing device 150, along with other application programs 120, as well as operating system software 115. Prior to execution, however, a copy of software interface monitor 110 may reside on mass storage 140 or other computer storage media. In addition to software loaded into memory, computing device 150 may also include at least one processor 130 and at least one mass storage device 140 that is connected to processor 130 via mass storage interface 135. Additionally, computing device 150 may include network interface 160, which allows computing device 150 to send and receive data to and from other computing devices connected to network 165.

When executed, software interface monitor 110 may communicate with software repository interface 185 in order to compile a snapshot of the interface portions of individual software modules contained in software repository 190. According to an embodiment, a snapshot is a recorded compilation of software declarations for selected public or externally-accessible data objects and subroutines contained in a software library or repository. Depending on the particular programming language(s) used, a data object may be called other names, such as "parameter," "data structure," "data element," "field," "variable," "object," "class," or "property." Similarly, a subroutine may be called "function," "procedure," "method," or other terms known in the art.

For each subroutine and/or data object included in a snapshot, a variety of attributes may be recorded. For example, one attribute of a data object may be the object's data type. As is known, a data type is a category of data. Typical data types include void (no type), integer numeric, alpha-numeric (character), floating point numeric, logical (true/false), date, and pointer (memory address). Other data types are well known in the art. Specific data types are generally dependent on the particular language used to define a data object.

Other data object attributes that may be recorded in a snapshot include: size, array, events, class, superclass, and aggregation. The size of a data object may indicate the number of memory elements required to store that data object. Alternatively, data object size may indicate a maximum number of significant digits, a maximum value, or some other size-related limitation.

An array is an ordered arrangement of a plurality of data objects that is well known in the art. For example, a vector is a one-dimensional array; a matrix is a two-dimensional array. Most programming languages have the ability to define and manipulate arrays of data objects in more than one dimension.

Aggregation is an attribute indicating that a data object is a collection of other data objects and/or subroutines, each having possibly different sets of individual attributes. Aggregation is common in object-oriented languages, where a given object may comprise collections of subroutines (sometimes called methods) as well as collections of data objects (sometimes called properties), all of which together define the object. As is known in the art, collections may be nested. That is, a collection may include other collections, each of which may include even more collections, in a nested fashion.

Some data objects may be classified as optional or mandatory. This designation is another attribute that is most often a characteristic of subroutine parameters. For example, in some programming languages, an optional subroutine parameter may be given a default value. In this circumstance, if the subroutine is invoked without that parameter, its default value is used. On the other hand, if the subroutine is invoked with the optional parameter, but its value differs from the default value, the default value will be overridden by the new value.

As has been stated, snapshots may include subroutine declarations as well as data object declarations. A subroutine is a group of computer instructions written in a computer programming language. Terms known in the art to be equivalent to the term "subroutine" include: module, procedure, function, method and macro. Subroutines may accept parameters, which are themselves data objects that have attributes. Depending on the features of the programming language in which they are implemented, a subroutine may or may not return a value after it is executed. If a subroutine does return a value, the subroutine itself may possess data type attributes corresponding to the type of information the subroutine returns. Another attribute of a subroutine may be its invocation mechanism. Some subroutines may be invoked directly by a traditional subroutine call. Others may be invoked remotely via a Remote Function Call (RFC) or Remote Procedure Call (RPC).

Within object-oriented approaches to software engineering, a software object may include both subroutines and data objects, as well as object-oriented attributes, such as class definitions and hierarchies, rules of instantiation, and rules of inheritance. Thus, according to an embodiment, a snapshot may also include software object declarations, in addition to subroutine declarations and data object declarations.

For convenience, the terms "software element," or simply "element" will be used interchangeably herein to refer to any software object, the declaration of which may be recorded in a snapshot. Thus, without loss of generality, a software element may correspond to a subroutine declaration, a subroutine parameter declaration, a data object declaration, or a software object declaration.

A snapshot may be structured or implemented according to any number of techniques known in the art for storing software element declarations. For example, a snapshot may be implemented as a computer file containing a database of records corresponding to the software elements found in a software library or repository. A snapshot may also be implemented as a computer file containing a text-based list with each line in the file describing a software element declaration. As another example, a snapshot may be implemented as a symbol table similar to the kind produced by high-level computer language compilers when they compile source code into linkable or relocatable binary files. A snapshot need not be stored in a computer file, but may be placed in random access memory (RAM) or other forms of storage media known in the art.

Returning to FIG. 1, to assemble a snapshot of software repository 190, software interface monitor 110 may first cause processor 130 to invoke network interface 160. Network interface 160 may then communicate over network 165 to locate and establish a network connection with network interface 175 residing on network server 170. Responding to a connection request from network interface 160, network interface 175 may communicate with network server processor 180 to establish a communication session between software interface monitor 110 and software repository 190 though software repository interface 185. Once this communication session has been created, software interface monitor 110 may then query software repository interface 185 in order to build a snapshot of the interface portion of each public software module selected from software repository 190. Software interface monitor 110 may store the resulting snapshot on mass storage 140. Alternatively, software interface monitor 110 may store the resulting snapshot on a suitable mass storage device residing elsewhere on network 165.

Some time later, software interface monitor 110 may assemble a second snapshot of software repository 190 using the same procedure. Once the first snapshot and the second snapshot have been assembled, software interface monitor 110 may then compare the two snapshots to determine whether software repository 190 has changed. Based on that comparison, software interface monitor 110 may analyze the detected differences between the two snapshots and may determine that software repository 190 is no longer backward compatible.

Software repository 190 and software repository interface 185 need not be located on a remote network server 170. Instead, software repository 190 and software repository interface 185 may be co-located on computing device 150.

Figure 2:
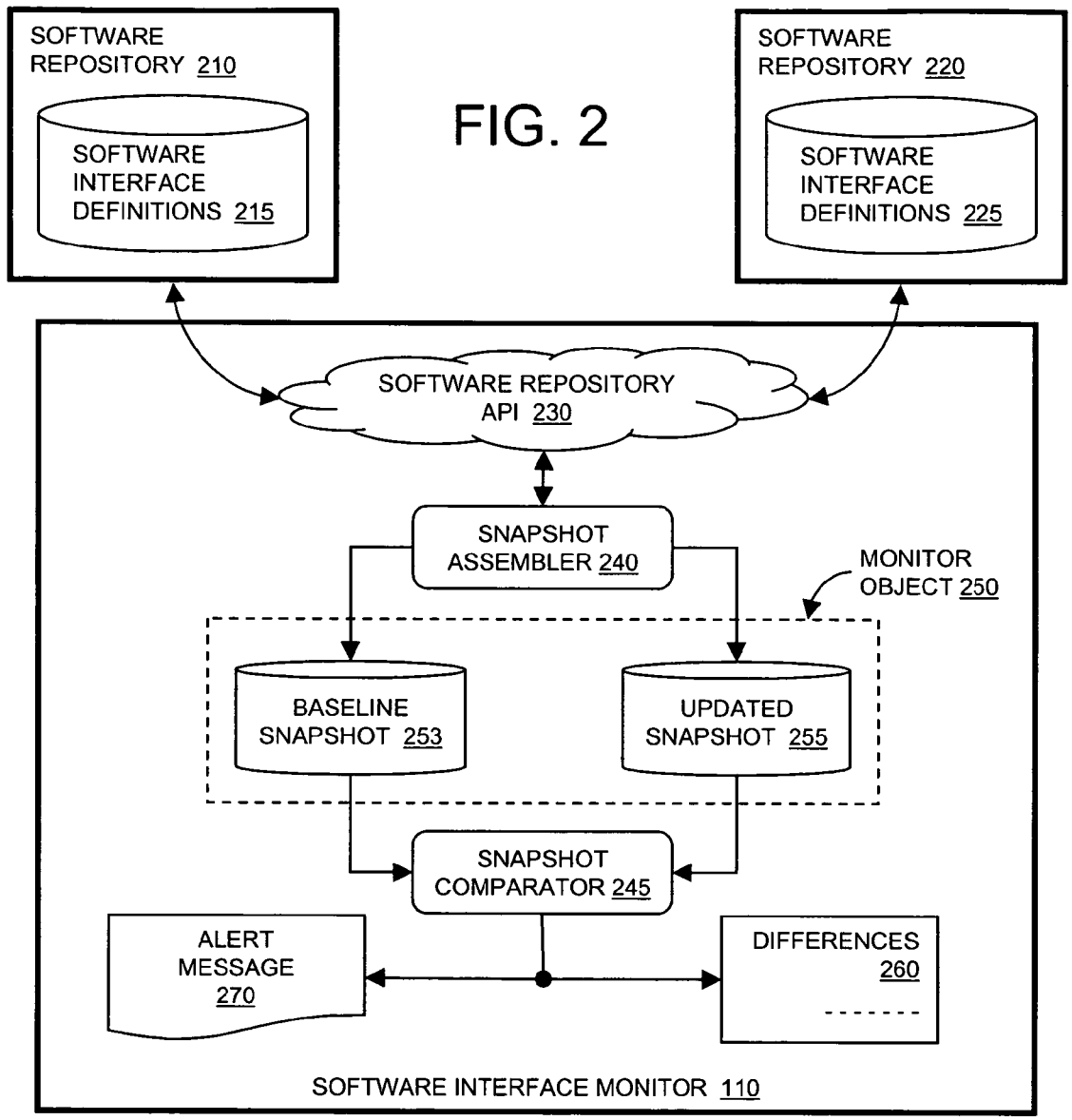
FIG. 2 is a logical block diagram illustrating the primary elements of a software interface monitor, according to an embodiment of the present invention.

FIG. 2 is a logical block diagram illustrating the primary elements of a software interface monitor, according to an embodiment of the present invention. As shown in FIG. 2, software interface monitor 110 may include two processing components: snapshot assembler 240 and snapshot comparator 245. Additionally, software interface monitor 110 may also include a number of monitor objects 250. A monitor object is a software data structure that contains information pertaining to the software repository that is being monitored for backward compatibility by software interface monitor 110. For example, a monitor object may contain the name of a user or login ID, a list of software elements in the repository that are to be monitored, and the network name or ID of the computer on which the software repository is located. A monitor object may also include a first (or baseline) snapshot 253 of the software repository, as well as a second (or updated) snapshot 255 of the software repository. Alternatively, a monitor object may include pointers to baseline snapshot 253 and updated snapshot 255, each of which may be stored in separate locations.

Still referring to FIG. 2, snapshot assembler 240 may assemble a baseline snapshot 253 of software repository 210 by invoking methods provided by software repository application programmer's interface (API) 230 that permit snapshot assembler 240 to access software interface definitions 215, which describe the accessible software elements provided by software repository 210.

Software interface definitions 215 may comprise a dictionary—that is, a database of definitional information for each publicly accessible software element, including information describing the attributes of each subroutine and its parameters, as well as the attributes of each data object and/or each software object. Alternatively, software interface definitions 215 may comprise a symbol table of the type normally produced by language compilers known in the art. Software interface definitions 215 may also be implemented as a simple text list.

According to an embodiment, snapshot assembler 240 may first assemble a baseline snapshot 253 of software repository 210. At some later time, either triggered automatically according to event-driven methods known in the art, or triggered manually at the discretion of an operator, snapshot assembler 240 may assemble an updated snapshot 255 of software repository 210. If software repository 210 has not been modified since baseline snapshot 253 was assembled, updated snapshot 255 may be substantially identical to baseline snapshot 253. On the other hand, if software repository 210 has been changed since snapshot assembler 240 assembled baseline snapshot 253, and particularly if software interface definitions 215 have been changed in the meantime, then updated snapshot 255 may include those new definitions and thereby be different from baseline snapshot 253.

Rather than create two snapshots of the software repository 210, where each snapshot is separated from the other by a period of time, an embodiment of the present invention may also create snapshots of different software repositories for comparison. Still referring to FIG. 2, snapshot assembler 240 may interact with software repository API 230 to assemble baseline snapshot 253 from software interface definitions 215. Then, snapshot assembler 240 may interact with software repository API 230 to assemble updated snapshot 255 from software interface definitions 225, which define the accessible software elements corresponding to a second software repository 220.

The two software repositories 210 and 220 may comprise different releases or versions of the same software library. On the other hand, software repositories 210 and 220 may comprise software libraries having substantially different capabilities and interfaces. Software repositories 210 and 220 may be located on different computers, or may be located on the same computer. Additionally, software repositories 210 and 220 may be located on the same computer as software interface monitor 110.

Again referring to FIG. 2, snapshot comparator 245 may compare baseline snapshot 253 and updated snapshot 255 to detect differences 260 between them. These detected differences 260 may be optionally output to a computer file or a display (not shown), or they may be transmitted to another computer over network 165 (see FIG. 1). As snapshot comparator 245 detects differences 260 between baseline snapshot 250 and updated snapshot 255, snapshot comparator 245 may rate each detected difference according to a backward compatibility metric. As the difference ratings are compiled, snapshot comparator 245 may also form an overall backward compatibility rating of updated snapshot 255 with respect to baseline snapshot 253. This overall backward compatibility rating may then be compared to a backward compatibility threshold. If the overall backward compatibility rating exceeds the backward compatibility threshold, snapshot comparator 245 may issue an alert message 270 indicating that updated snapshot 255 is not backward compatible with baseline snapshot 250. In addition to alert messages, snapshot comparator 245 may also transmit the detected differences 260 to selected users via any number of methods known in the art, including e-mail.

FIG. 3 is a high-level flow chart illustrating a method 300 for creating a monitor object for monitoring a software repository, according to an embodiment of the present invention. The method 300 initially receives user preferences information, which may include a user's name, a name to be assigned to the monitor object, and other system profile information (310). After initialization (310), the method selects the particular software repository to be monitored, and may then communicate interactively with a user to identify and select the particular software elements to be monitored in the software repository (320) and included in a snapshot. As part of this selection step, method 300 may record information necessary to locate and access the selected software repository, such as a remote computer ID and other security information (320). Method 300 then assembles a baseline snapshot of the selected elements in the desired software repository (330). To select the desired software repository and assemble the baseline snapshot, method 300 may access a software object repository API (see FIG. 2, item 230), which may provide software methods capable of: (1) accessing a desired software object repository, (2) listing the software elements published by the software object repository, and (3) selecting desired software elements to be included in the snapshot. Using additional software object repository API 230 capabilities, method 300 may retrieve data declarations and attributes for each selected software element (330). Method 300 may then convert the retrieved information into an internal snapshot format using methods known in the art (330). Finally, method 300 may save the data comprising the now-initialized and activated monitor object (340).

FIG. 4 is a high-level flow chart illustrating a method 400 for updating a monitor object, according to an embodiment of the present invention. The method 400 may begin when a user invokes the software interface monitor 110 and selects a particular monitor object to update. Alternatively, method 400 may begin when software interface monitor 110 is invoked by an event-driven trigger, which may select a particular monitor object. Method 400 then accesses the selected monitor object, retrieves the stored profile information and software object repository information from the monitor object, and loads the previously-assembled baseline snapshot into memory (410). Method 400 then accesses the identified software object repository and assembles an updated snapshot in the same manner that was used to assemble the baseline snapshot (420) (see also, FIG. 3—method 300; FIG. 2—discussion of snapshot assembler 240). When both the baseline snapshot and the updated snapshot are assembled and available, method 400 begins the process of comparing the two snapshots to detect any differences between them (430). The result of this comparison is a table of detected differences between the two snapshots (430). These detected differences are each rated or categorized according to a backward compatibility metric (440), and the overall backward compatibility status of the software object repository is determined, based on the rated differences (450). Following the snapshot comparison and determination of backward compatibility, method 400 may output the backward compatibility status as well as the detected differences according to the profile information stored in the monitor object (460). For example, if the backward compatibility status indicates that the software object repository is no longer backward compatible, method 400 may elect to issue an alert message (see item 270, FIG. 2) to the appropriate users identified in the monitor object. Alternatively, method 400 may simply output the detected differences and overall backward compatibility information to a display for review by an interactive user. Finally, method 400 may reset the monitor object by replacing the old baseline snapshot with the new updated snapshot (470).

In addition to comparing an old snapshot of a software object repository with a new snapshot of the same software object repository, methods 300 and 400 may be employed to compare one software object repository with a different software object repository. In this alternate use, step (420) of method 400 may be modified to permit selection of a different software object repository.

Figure 5:
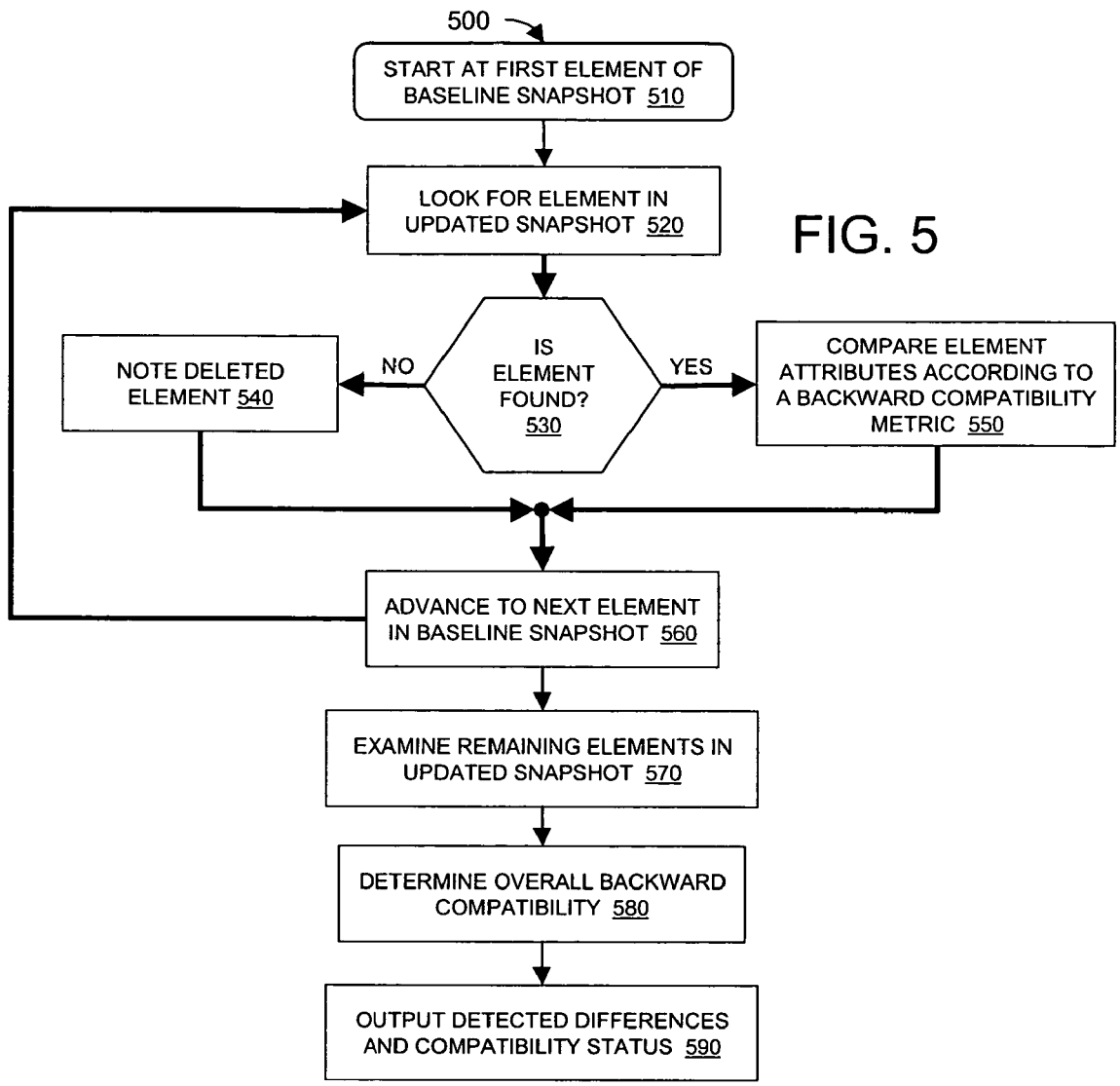
FIG. 5 is a detailed flow chart illustrating a method for comparing one snapshot with another, according to an embodiment of the present invention.

FIG. 5 is a detailed flow chart illustrating a method 500 for comparing one snapshot with another, according to an embodiment of the present invention. Once a baseline snapshot and an updated snapshot have been loaded into memory, method 500 may begin by selecting the first element of baseline snapshot (510). Holding the first element of baseline snapshot in one hand, method 500 looks for the same element in updated snapshot (520). If the element is not found in updated snapshot (530), method 500 notes its absence (540) and advances to the next element in the baseline snapshot (560). Otherwise, if the element is present in the updated snapshot, method 500 compares the element's attributes, and records any detected differences (550). At the same time (or alternatively in a separate step, as discussed in FIG. 4, step 440), the method also evaluates the detected differences according to a backward compatibility metric. Method 500 then advances to the next element in the baseline snapshot (560) and repeats the process (520). After all of the elements in the baseline snapshot have been examined and/or compared to corresponding elements in the updated snapshot, method 500 determines whether any elements remain in the updated snapshot that should be considered. If elements remain in the updated snapshot, method 500 evaluates each of them according to the same backward compatibility metric (570). Finally, an overall backward compatibility value is determined for the updated snapshot based on the individual ratings of each detected difference between the two snapshots (580), and the detected differences are output, along with the overall backward compatibility status (590).

At step 550, method 500 compares the attributes of corresponding elements in two snapshots, records any detected differences, and then rates or evaluates the detected differences according to a backward compatibility metric (550).

This is an algorithmic process that considers each type of difference separately. For example, an element that is present in a baseline snapshot, but is missing or omitted from an updated snapshot is an incompatible difference. An element that changes from optional to mandatory is also considered to be an incompatible difference. A new element (one that is present only in the updated snapshot, not the baseline snapshot) is not necessarily incompatible. However, if the new element is mandatory, then it creates an incompatible difference. Also, a new field in a data structure will create an incompatible difference, but only if the field is inserted between other members of the data structure and only if the data structure is a parameter to a subroutine that is invoked through a Remote Function Call (RFC). If the new field is added to the end of the data structure, the new data structure may still be compatible with the old data structure.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method for monitoring updates in a software repository in a multi-author software design environment, comprising:
   constructing a first snapshot of a set of software module source code stored by the software repository at a first point in time, the source code represented by a plurality of objects;
   constructing a second snapshot of the set of software module source code stored by the software repository at a second point in time;
   comparing the first snapshot with the second snapshot, to detect differences in the source code;
   rating each detected difference according to a backward compatibility metric, the backward compatibility metric representing a probability that the detected difference renders a source code attribute of the second snapshot incompatible with a similar source code attribute of the first snapshot;
   determining an overall backward compatibility score for the second snapshot, based on the rated differences; and
   issuing an alert message to registered authors of the set of software module source code when the overall backward compatibility exceeds a backward compatibility threshold, wherein the alert message is issued only to users associated with objects for which differences are detected.

2. The method of claim 1, wherein the backward compatibility threshold is set by a registered author.

3. The method of claim 1, wherein the constructing is performed a plurality of times, to construct a plurality of successive snapshots representing the software repository as respective points in time, each successive snapshot having a version and being stored in a snapshot history database.

4. The method of claim 3, wherein each successive snapshot is constructed on a periodic basis.

5. The method of claim 4, wherein the periodic basis is a set timetable.

6. The method of claim 3, wherein each successive snapshot is constructed in response to a predefined event.

7. The method of claim 1, wherein the alert message is issued only to authors of objects for which differences are detected.

8. The method of claim 1, wherein the alert message is issued only when the overall backward compatibility score indicates the second snapshot is not backward compatible.

9. The method of claim 1, wherein the backward compatibility metric comprises a table of software modifications identifying backward-compatible software modifications and backward-incompatible software modifications.

10. The method of claim 1, wherein the backward-incompatible detected differences include: a deleted parameter from a subroutine; and a deleted field from a public data structure.

11. The method of claim 1, wherein the backward-incompatible detected differences include: an added mandatory parameter in a subroutine; and an added mandatory field in a public data structure.

12. The method of claim 1, wherein the backward-incompatible detected differences include: an optional parameter redefined as a mandatory parameter; a changed parameter data type; and a changed public field data type.

13. A system for monitoring updates in a software repository in a multi-author software design environment, comprising:
   a processor configured to construct a first snapshot of a set of software module source code stored by the software repository at a first point in time, the source code represented by a plurality of objects;
   the processor configured to construct a second snapshot of the set of software module source code stored by the software repository at a second point in time;
   the processor configured to compare the first snapshot with the second snapshot, to detect differences in the source code;
   the processor configured to rate each detected difference according to a backward compatibility metric, the backward compatibility metric representing a probability that the detected difference renders a source code attribute of the second snapshot incompatible with a similar source code attribute of the first snapshot;
   the processor configured to determine an overall backward compatibility score for the second snapshot, based on the rated differences;
   the processor, in connection with an output device, configured to issue an alert message to registered authors of the set of software module source code when the overall backward compatibility exceeds a backward compatibility threshold, wherein the alert message is issued only to users associated with objects for which differences are detected.

14. The system of claim 13, wherein the first and second snapshots are constructed from a subset of the software module source code, the subset specified by a registered author.

15. The system of claim 13, wherein the constructing is performed a plurality of times, to construct a plurality of successive snapshots representing the software repository as respective points in time, each successive snapshot having a version and being stored in a snapshot history database.

16. The system of claim 15, wherein each successive snapshot is constructed on a periodic basis.

17. The system of claim 16, wherein the periodic basis is a set timetable.

18. The system of claim 15, wherein each successive snapshot is constructed in response to a predefined event.

19. The system of claim 13, wherein the alert message is issued only to authors of objects for which differences are detected.

20. The system of claim 13, wherein the alert message is issued only when the overall backward compatibility score indicates the second snapshot is not backward compatible.

21. The system of claim 13, wherein the backward compatibility metric comprises a table of software modifications identifying backward-compatible software modifications and backward-incompatible software modifications.

22. The system of claim 13, wherein the backward-incompatible detected differences include: a deleted parameter from a subroutine; a deleted field from a public data structure, an added mandatory parameter to a subroutine, an added mandatory field to a public data structure, an optional parameter redefined as a mandatory parameter, a changed parameter data type, and a changed public field data type.

23. A computer-readable storage medium encoded with instructions configured to be executed by a processor, the instructions which, when executed by the processor, cause the performance of a method, comprising:
   constructing a first snapshot of a set of software module source code stored by the software repository at a first point in time, the source code represented by a plurality of objects;
   constructing a second snapshot of the set of software module source code stored by the software repository at a second point in time;
   comparing the first snapshot with the second snapshot, to detect differences in the source code;
   rating each detected difference according to a backward compatibility metric, the backward compatibility metric representing a probability that the detected difference renders a source code attribute of the second snapshot incompatible with a similar source code attribute of the first snapshot;
   determining an overall backward compatibility score for the second snapshot, based on the rated differences; and
   issuing an alert message to registered authors of the set of software module source code when the overall backward compatibility exceeds a backward compatibility threshold, wherein the alert message is issued only to users associated with objects for which differences are detected.

24. The computer-readable storage medium of claim 23, wherein the constructing is performed a plurality of times, to construct a plurality of successive snapshots, each successive snapshot having a version and being stored in a snapshot history database.

25. The computer-readable storage medium of claim 24, where the each successive snapshot is constructed on a periodic basis.

26. The computer-readable storage medium of claim 25, wherein the periodic basis is a set timetable.

27. The computer-readable storage medium of claim 24, wherein the periodic basis is responsive to a predefined event.

28. The computer-readable storage medium of claim 23, wherein the issuing is performed for only the authors of affected software modules.

29. The computer-readable storage medium of claim 23, wherein the alert message is issued only when the overall backward compatibility score indicates the updated version is not backward compatible.

30. The computer-readable storage medium of claim 23, wherein the compatibility metric comprises a table of software modifications including backward-compatible software modifications and backward-incompatible software modifications.

31. The computer-readable storage medium of claim 23, wherein the backward-incompatible detected differences include: a deleted parameter from a subroutine, a deleted field from a public data structure, an added mandatory parameter to a subroutine, an added mandatory field to a public data structure, an optional parameter redefined as a mandatory parameter, a changed parameter data type, and a changed public field data type.

32. A method for monitoring updates in a software repository in a multi-author software design environment, comprising:
   associating a registered author of the software design environment with a subset of a plurality of software module source code stored by the software repository, the source code defining a plurality of objects, wherein the subset is based on input received from the registered author;
   constructing a first snapshot of the subset at a first point in time;
   constructing a second snapshot of the subset at a second point in time;
   wherein each snapshot includes an aggregation of methods and parameters of the software module source code in the subset, with methods and parameters of any software module referenced by the software module source code in the subset;
   comparing the first snapshot with the second snapshot, to detect differences in the source code;
   rating each detected difference according to a backward compatibility metric, the backward compatibility metric representing a probability that the detected difference renders a source code attribute of the second snapshot incompatible with a similar source code attribute of the first snapshot;
   determining an overall backward compatibility score for the second snapshot, based on the rated differences; and
   issuing an alert message to the registered author of the subset when the overall backward compatibility exceeds a predetermined threshold set by input from the registered author, the alert message including a list of each rated difference, wherein the alert message is issued only to users associated with objects for which differences are detected.

* * * * *

UNITED STATES PATENT AND TRADEMARK OFFICE
CERTIFICATE OF CORRECTION

| | | |
|---|---|---|
| PATENT NO. | : 7,600,219 B2 | Page 1 of 1 |
| APPLICATION NO. | : 10/730975 | |
| DATED | : October 6, 2009 | |
| INVENTOR(S) | : Efstratios Tsantilis | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1152 days.

Signed and Sealed this

Fifth Day of October, 2010

David J. Kappos
*Director of the United States Patent and Trademark Office*